United States Patent
Ophardt

(10) Patent No.: US 10,424,184 B2
(45) Date of Patent: *Sep. 24, 2019

(54) PARALLEL HAND HYGIENE COMPLIANCE SYSTEM

(71) Applicant: OP-Hygiene IP GmbH, Niederbipp (CH)

(72) Inventor: Heiner Ophardt, Arisdorf (CH)

(73) Assignee: OP-Hygiene IP GmbH, Niederbipp (CH)

(*) Notice: Subject to any disclaimer, the term of this patent is extended or adjusted under 35 U.S.C. 154(b) by 0 days.

This patent is subject to a terminal disclaimer.

(21) Appl. No.: 16/003,608

(22) Filed: Jun. 8, 2018

(65) Prior Publication Data

US 2018/0293874 A1 Oct. 11, 2018

Related U.S. Application Data

(63) Continuation of application No. 14/869,674, filed on Sep. 29, 2015, now Pat. No. 10,008,098.

(30) Foreign Application Priority Data

Sep. 29, 2014 (CA) .................................... 2865608

(51) Int. Cl.
*G08B 21/24* (2006.01)
*G06K 7/10* (2006.01)
*G06Q 30/02* (2012.01)
*H04L 29/06* (2006.01)

(52) U.S. Cl.
CPC ....... *G08B 21/245* (2013.01); *G06K 7/10425* (2013.01); *G06Q 30/0233* (2013.01); *H04L 63/10* (2013.01)

(58) Field of Classification Search
CPC ...... G08B 21/00; G08B 21/24; G08B 21/245; G06K 7/10425; G06K 7/01; G06K 7/10; G06Q 30/02; G06Q 30/0233; G06Q 50/22; G06F 19/327; H04L 29/06; H04L 63/10; H04Q 9/00; H04Q 5/22
USPC .......................................... 705/14.33; 726/27
See application file for complete search history.

(56) References Cited

U.S. PATENT DOCUMENTS

| | | | |
|---|---|---|---|
| 6,542,568 B1 | 4/2003 | Howes, Jr. | |
| 7,375,640 B1 | 5/2008 | Plost | |
| 7,770,782 B2 | 8/2010 | Sahud | |
| 7,984,825 B2 | 7/2011 | Ophardt | |
| 8,196,810 B2 | 6/2012 | Sahud | |
| 8,215,523 B2 | 7/2012 | Ophardt | |
| 8,294,584 B2 | 10/2012 | Plost | |
| 8,448,848 B2 | 5/2013 | Sahud | |
| 8,684,236 B2 | 4/2014 | Ophardt | |
| 8,816,860 B2 | 8/2014 | Ophardt et al. | |
| 8,976,031 B2 | 3/2015 | Ophardt | |

(Continued)

*Primary Examiner* — Brian Wilson
(74) *Attorney, Agent, or Firm* — Thorpe North and Western, LLP

(57) ABSTRACT

In combination a group compliance system for monitoring hand-hygiene compliance of a plurality of persons using a plurality of hand cleaning fluid dispensers in facilities together with a personal compliance system for monitoring hand-hygiene compliance of an individual person of the dispensers within the facilities, however, with the individual person having control as to the extent that any data regarding their identity and hygiene events are disclosed to others.

20 Claims, 5 Drawing Sheets

(56) References Cited

U.S. PATENT DOCUMENTS

| | | |
|---|---|---|
| 2006/0071799 A1 | 4/2006 | Verdiramo |
| 2009/0224924 A1 | 9/2009 | Thorp |
| 2010/0094581 A1 | 4/2010 | Cagle |
| 2010/0155416 A1 | 6/2010 | Johnson |
| 2010/0188228 A1 | 7/2010 | Hyland |
| 2010/0328076 A1* | 12/2010 | Kyle .................. G06F 19/3418 340/573.1 |
| 2012/0112914 A1 | 5/2012 | Wegelin |
| 2012/0245951 A1 | 9/2012 | Gips et al. |
| 2013/0099929 A1 | 4/2013 | Ophardt |
| 2013/0332184 A1 | 12/2013 | Burnham et al. |
| 2014/0081653 A1* | 3/2014 | Davis .................. G06Q 30/018 705/2 |
| 2014/0104062 A1 | 4/2014 | Weiner |
| 2014/0253336 A1 | 9/2014 | Ophardt |
| 2015/0134357 A1 | 5/2015 | Davis et al. |
| 2015/0170501 A1 | 6/2015 | Mukherji et al. |

* cited by examiner

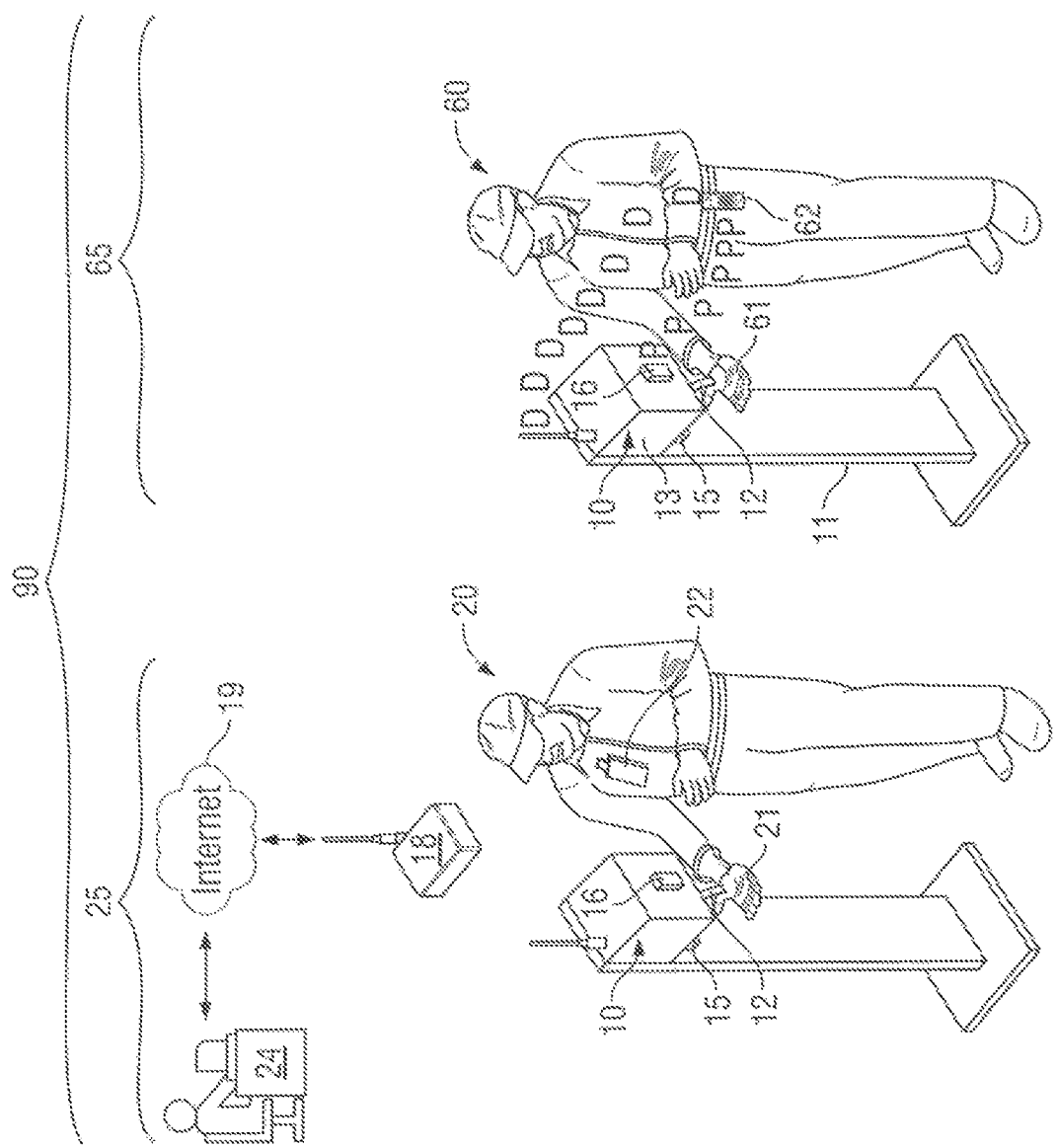

PARALLEL HAND HYGIENE COMPLIANCE SYSTEM

RELATED APPLICATION

This application is a continuation of U.S. patent application Ser. No. 14/869,674 filed Sep. 29, 2015 and claims the benefit of 35 U.S.C. 120.

SCOPE OF THE INVENTION

This invention relates to hand-hygiene compliance monitoring and, more particularly, to a method and system for monitoring hand washing by an individual person in a confidential manner in conjunction with hand-hygiene compliance monitoring of a group of persons.

BACKGROUND OF THE INVENTION

Known hand-hygiene compliance monitoring systems monitor hand cleaning events of persons such as in hospitals, healthcare facilities and restaurants. In many systems, each person wears an identification tag which identifies that person and the compliance system monitors the identity of that person when they activate a hand cleaning fluid dispensing dispenser and the time and location of the hand cleaning event. Such compliance systems provide not only group compliance data regarding the activity of a group of persons but also individual data regarding the identity and hygiene events of each individual person.

Such known hand-hygiene compliance systems suffer a number of disadvantages. One disadvantage is that the gathering and storage of information about the individual person may be in breach of privacy laws in various jurisdictions. Another disadvantage is that persons are reluctant to agree to participate in such hand-hygiene compliance monitoring as they are concerned that their hygiene practices will be inferior to the hygiene practices of other persons and negatively affect their employment.

SUMMARY OF THE INVENTION

To at least partially overcome these disadvantages of previously known devices, the present invention provides a hand-hygiene compliance monitoring system in which an individual person controls the extent to which the identity of the person and any hygiene events associated with that person may be disclosed to others.

Preferably, to overcome these disadvantages of previously known devices, the present invention provides in combination a group compliance system for monitoring hand-hygiene compliance of a plurality of persons using a plurality of hand cleaning fluid dispensers in facilities together with a personal compliance system for monitoring hand-hygiene compliance of an individual person of the dispensers within the facilities, however, with the individual person having control as to the extent that any data regarding their identity and hygiene events are disclosed to others.

In one aspect, the present invention provides a method of monitoring the use of a plurality of hand cleaning fluid dispensers in a facility frequented by a number of persons, wherein:

each of the dispensers is located at a location in the facility spaced relative the location of other of the dispensers and, when activated by a person proximate each respective dispenser, each dispenser dispenses a fluid onto the person's hand suitably positioned relative the dispenser, the method comprising:

providing a group compliance system comprising a first computer and a first communications network providing communication between each of the dispensers and the first computer, on the dispensing of the fluid by each of the dispensers, communicating group data from each of the dispensers regarding the dispensing by each of the dispensers to the first computer via the first communications network;

monitoring with the first computer the group data regarding the dispensing of fluid by each of the dispensers and calculating group compliance data representing the dispensing of fluid by the dispensers based on the group data, providing a personal compliance system comprising a personal computing device carried by one person, a second computer and a second communication network providing communication between each of the dispensers, the second computer and the personal computing device, determining when any one of the dispensers is a proximate dispenser by being sufficiently close to the personal computing device that the one person carrying the personal computing device can have fluid from that respective dispenser dispensed onto a hand of the one person, on the dispensing of the fluid by each of the dispensers while each comprises the proximate dispenser, communicating personal data from the proximate dispenser regarding the dispensing by the proximate dispenser wirelessly to the personal computing device, and communicating the personal data to the second computer;

monitoring with the second computer the personal data regarding the dispensing of fluid by each of the dispensers while each of the dispensers is the proximate dispenser and calculating personal compliance data representing the dispensing of fluid by the dispensers based on the persona data while each of the dispensers is the proximate dispenser, designating as private data the personal data from the proximate dispenser regarding the dispensing by the proximate dispenser and data derived therefrom including the personal compliance data;

preventing communication from the personal compliance system other than to the one person of the private data unless authorized by the one person, communicating from the personal compliance system to the one person of the personal compliance data or data derived therefrom to the one person.

In another aspect, the present invention provides a compliance system in a facility including:

a plurality of hand cleaning fluid dispensers, each of the dispensers located at a location in the facility spaced relative the location of other of the dispensers, when activated by a user proximate each respective dispenser, each dispenser dispensing a fluid onto the user's hand suitably positioned relative the dispenser, a group compliance system comprising a first computer and a first communications network providing communication between each of the dispensers and the first computer, each of the dispensers providing data to the first computer via the first communications network regarding the dispensing of the fluid by each of the dispensers;

the first computer monitoring the data regarding the dispensing of fluid by each of the dispensers and calculating group compliance data representing the dispensing of fluid by the dispensers, a personal compliance system comprising a personal computing device carried by one person, each of the dispensers providing data to the personal computing device wirelessly representing the dispensing by each of the dispensers of the fluid onto the hand of the one person;

the personal compliance system monitoring the data regarding the dispensing of fluid by each of the dispensers by the one person and calculating personal compliance data representing the dispensing of fluid by the one person, the personal compliance system communicating the personal compliance data to the one person.

BRIEF DESCRIPTION OF THE DRAWINGS

Further aspects and advantages of the present invention will become apparent from the following description taken together with the accompanying drawings in which:

FIG. 5 is a view the same as FIG. 2 but showing a second embodiment of the right hand side personal compliance system.

DETAILED DESCRIPTION OF THE DRAWINGS

Figure 1:
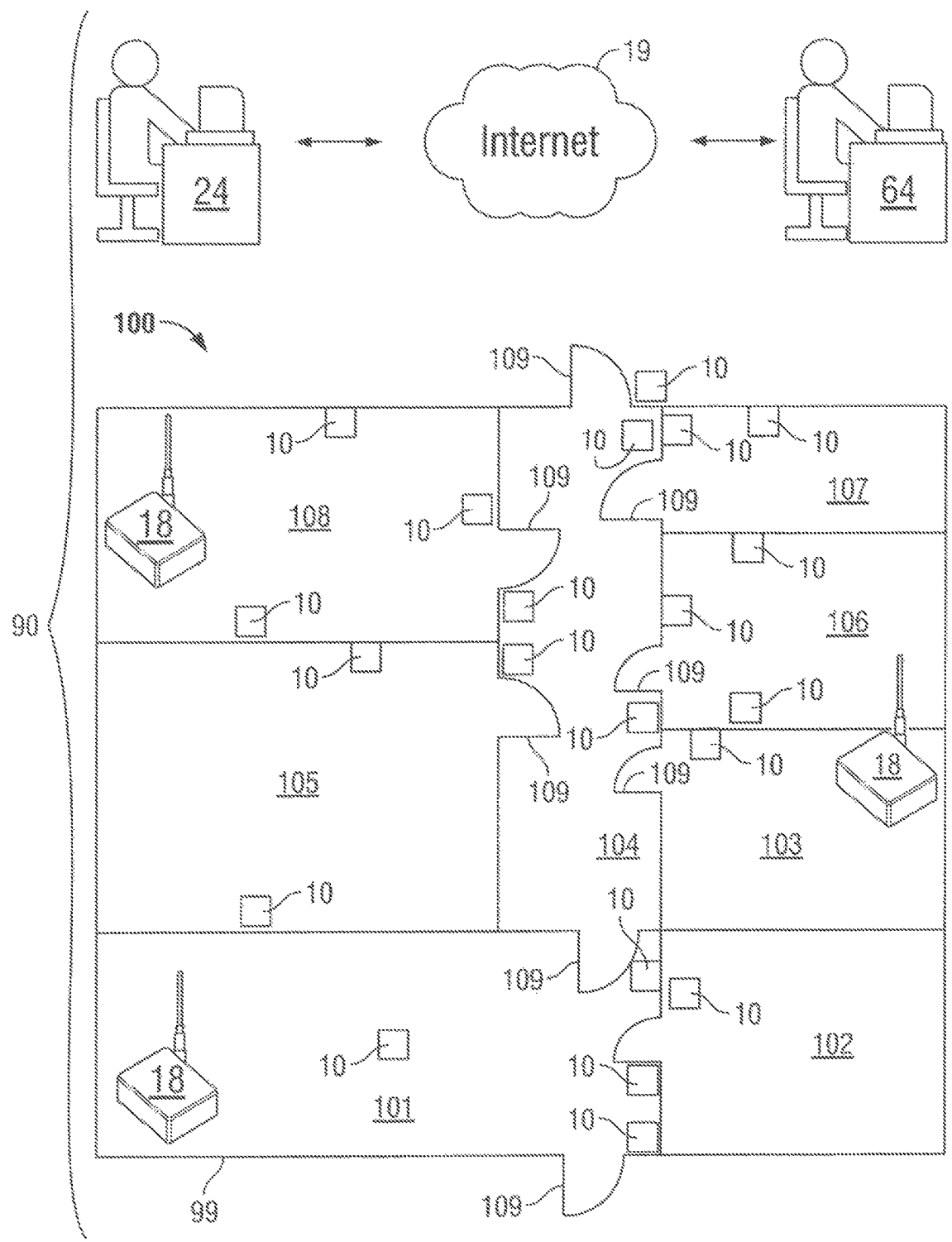
FIG. 1 is schematic view of a hand-hygiene compliance monitoring system in accordance with the present invention.

Reference is made first to FIG. 1 which schematically illustrates a hand-hygiene compliance monitoring system 90 in accordance with the present invention including: a facility 100 having a number of hand cleaning fluid dispensers 10 where persons are to clean their hands; a first computer 24, a second computer 64, a plurality of routers 18 and the Internet 19. The facility 100 may be, for example, a hospital or a healthcare facility or a food processing or preparation facility.

The facility 100 is schematically shown in a plan view as having a plurality of walls 99 which divide the facility into a number of rooms 101 to 108 as connected by doorways, each of which is adapted to be closed by a pivoting door 109. Throughout the facility 100, the dispensers 10 are located at desired locations where they will be convenient to use by a person such as a worker within the facility as, for example, on either side of each doorway, on walls and, in the case of room 101, freestanding in the middle of the room.

On FIG. 1, the three wireless routers 18 are schematically shown as spaced about the facilities. FIG. 1 shows the first computer 24 and the second computer 64 which are in communication with the wireless routers 18 as preferably in a wireless manner via the Internet indicated as 19. The first computer 24 and the second computer 64 may be located in the facility or at some other location remote from the facility 100.

Figure 2:
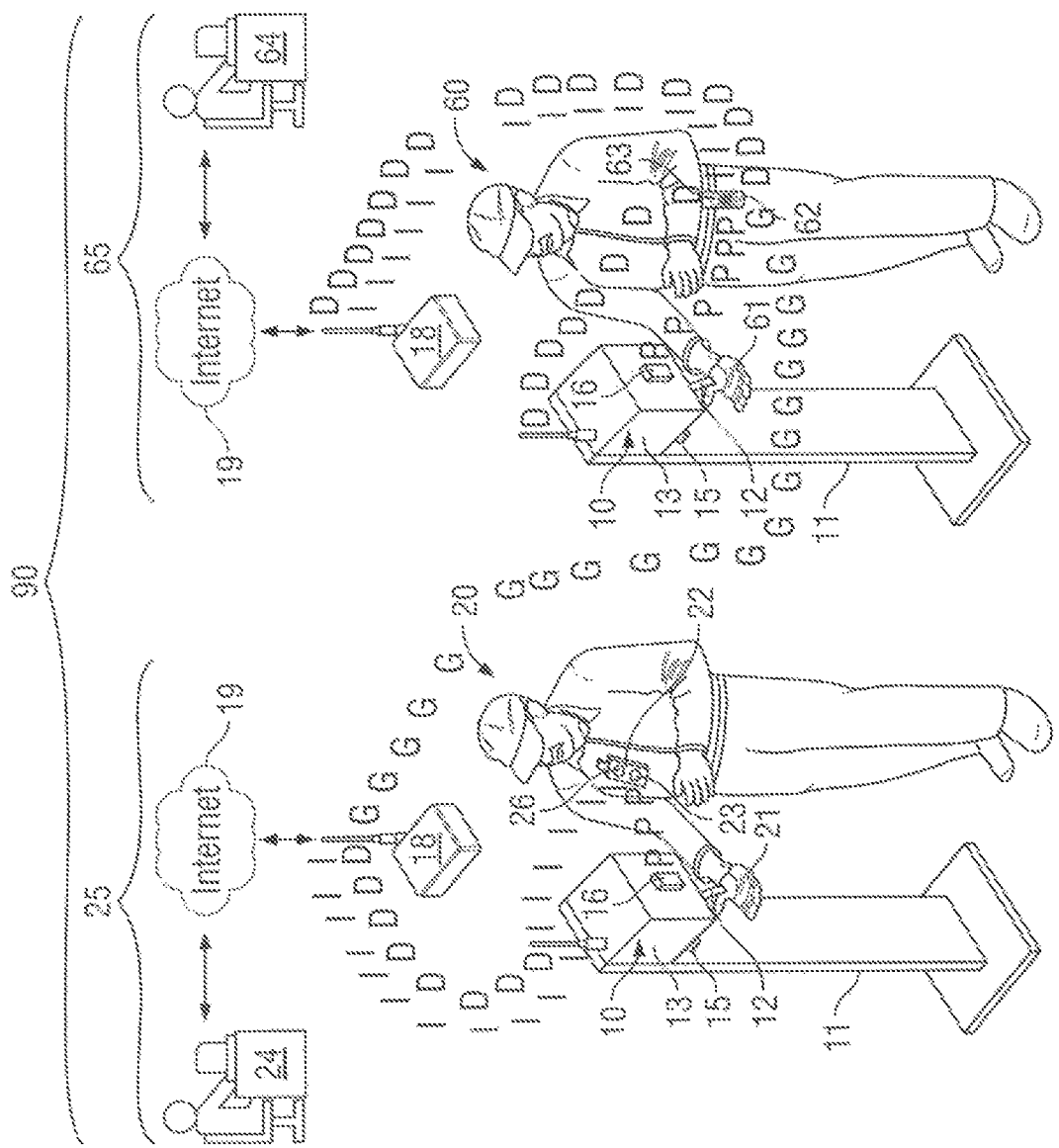
FIG. 2 is a schematic view showing two persons simultaneously using two of the dispensers in the hand-hygiene compliance monitoring system of FIG. 1 in a first embodiment.

Reference is made to FIG. 2 which schematically illustrates two identical dispensers 10 from the facility 100 of FIG. 1 being hypothetically concurrently used by a first person 20 and a second person 60. In FIG. 2, each dispenser 10 is shown as being supported on a freestanding support tower 11. Each dispenser 10 is adapted when activated to discharge a dose of hand cleaning fluid from a downwardly directed discharge outlet 12. The dispenser 10 includes a housing 13 which in a known manner includes, while not shown, a hand cleaning fluid containing reservoir, a pump to discharge the fluid out the outlet 12 when activated, a dispenser control system for controlling and activating the pump for discharge of the fluid, and a dispenser communications system. For example, each dispenser 10 may comprise a touchless dispenser such as, for example, disclosed in U.S. Pat. No. 7,984,825 to Ophardt et al, issued Jul. 26, 2011, the disclosure of which is incorporated herein by reference. The dispensers 10 in FIG. 2 are preferably touchless dispensers which includes a hand sensing system 15 which senses the presence of a user's hand underneath the discharge outlet 12 and, while the user's hand is underneath the discharge outlet 12, activates the pump in the dispenser 10 to discharge a dose of cleaning fluid onto the user's hand. A suitable hand sensing and activation system involving an electromagnetic emitter and a sensor to sense electromagnetic radiation from the emitter which is reflected off a hand is disclosed in the above-mentioned U.S. Pat. No. 7,984,825. However, the nature of the dispensers 10 useful with this invention are not limited and various different dispensers may be used including manually operated dispensers, for example, as disclosed U.S. Pat. No. 8,684,236 to Ophardt, issued Apr. 1, 2014.

Each dispenser 10 is shown as including an antenna which serves to send or receive wireless signals, preferably WiFi or Bluetooth, signals as between the dispenser communication system of the dispenser 10 and other components in the compliance system 90.

The first person 20 is shown as located proximate to the left dispenser 10 in FIG. 2, with a hand 21 of the first person 20 disposed underneath the discharge outlet 12 such that on activation of the dispenser 10, the dispenser 10 discharges the fluid onto the user's hand 21.

The first person 20 is shown as carrying an identification badge 22 as mounted to the person's shirt. The identification badge 22 is a device which carries identification data which uniquely identifies the person 20. The identification badge 22 functions to disclose the identification data of the person 20 to the compliance system 90. The identification badge 22 also provides a badge proximity system in a first proximity system which identifies the location of the first person 20 as being sufficiently close to the left dispenser 10 that the left dispenser 10 may be activated by the first person 20 to dispense the fluid onto the hand 21 of the first person 20. The first proximity system preferably comprises a wireless proximity sensor 16 carried on the left dispenser 10 which, for example, measures a relative strength of a proximity signal P transmitted by an emitter of the badge proximity system carried by the badge 22. The proximity signal P is shown as a line of letters "P" between the proximity sensor 16 on the left dispenser 10 and the badge 22.

The identification badge 22 includes a badge communication system which communicates wirelessly with the dispenser communication system 15 of the left dispenser 10 such that identification data I is disclosed from the identification badge 22 to the left dispenser 10 wirelessly as indicated by the wireless signal shown as a line of letters "I" in a line between the identification badge 22 and the wireless router 18.

In the embodiment of FIG. 2, dispensing data D regarding the operation of the left dispenser 10 is developed by a dispenser control system within the left dispenser 10 and communicated wirelessly from the left dispenser 10 to the wireless router 18 and, hence, via the Internet 19 to the first computer 24. The dispensing data D is schematically illustrated by the wireless signal shown as a line of letters "D" between the antenna of the left dispenser 10 and the antenna on the wireless router 18. The dispensing data D includes without limitation data regarding the dispensing of the fluid and preferably including the time of activation and location of the dispenser. In FIG. 2, the identification data I is also communicated from the left dispenser 10 to the router 18.

In FIG. 2, preferably for each activation of the left dispenser 10 which dispenses fluid, the dispensing data D regarding the activation together with the identification data "I" regarding the identification of the first person 20 is provided to the first computer 24. The first computer 24 and every dispenser 10 in the facility as used by all persons 20 carrying an identification badge 22 provides a group compliance system 25. Thus, a group of first persons 20 within the facility 100 each carry a unique identification badge 22 and the hygiene events of each of these first persons 20 with all the dispensers 10 in the facility 100 are monitored by the group compliance system 25 in a manner as indicated with one person 20 from the group on the left hand side of FIG. 2 with the dispensing data D from the activations of each of the different dispensers 10 and the identification data I provided to the first computer 24. On the dispensing of fluid by each of the dispensers 10, dispensing data D and the identification date I regarding the dispensing by each of the dispensers 10 by each first person 20 is provided to the first computer 24 by a first communication network comprising in the preferred embodiment of FIG. 1, the dispenser communication system of each dispenser 10, the wireless routers 18, the Internet 19 and a first computer communication system of the first computer 24 is to receive and send the data. The first computer 24 monitors such group data regarding the dispensing of fluid by each of the dispensers 10 by the first persons 20 and calculates group compliance data representing the dispensing of fluid by the dispensers 10 by the first persons 20 based on the group data. The group compliance data provides one or more measures of hand-hygiene compliance including, for example, an indication of the number of times that the average first person 20 cleans their hands in a typical work shift.

Reference is made to the right hand side of FIG. 2 which illustrates a personal compliance system 65 including a smart phone 62, the right dispenser 10, the wireless router 18, the Internet 19 and the second computer 64. The right dispenser 10 is identical to the left dispenser 10 and similar reference numerals are used to refer to similar elements. On the right side of FIG. 2, a second person 60 is shown to have his hand 61 located under the outlet 12 of the dispenser 10 such that the dispenser 10 will discharge the hand cleaning fluid onto the hands 61 of the second person 60. The second person 60 carries on their person a personal computing device in the preferred form of the smart phone 62.

The smart phone 62 includes a personal hygiene computer application. The personal hygiene computer application is controlled by the person 60 and has a number of features. The personal hygiene computer application can be activated by the second person 60 to provide a unique identifier code, which is associated with the second person 60 and is communicated in manners as controlled by the second person 60. In the configuration as illustrated on the right hand side of FIG. 2, the smart phone 62 and its application are selected by the second person 60 to operate in a manner such that the smart phone 62 serves a first function of providing a phone proximity system in a second proximity system which identifies when the second person 60 is sufficiently close to the right dispenser 10 that the second person 60 may place their hand 61 underneath the discharge outlet 12 of the right dispenser. The second proximity system preferably comprises the wireless proximity sensor 16 carried on the right dispenser 10 which, for example, measures a relative strength of a proximity signal transmitted by an emitter of the phone proximity system. The phone proximity system may be the same or different than the badge proximity system. On the right side of FIG. 2, the proximity signal P is shown as a line of the letters "P" between the smart phone 62 and the proximity sensor 16.

The right dispenser 10 sends dispenser data D as a wireless signal regarding the dispensing of fluid by the right dispenser 10 which signal is indicated by the line of the letters "D" between the right dispenser 10 and the smart phone 62. The smart phone 62 is adapted to receive and process the dispenser data D. The smart phone 62 provides personal data including identification data I to the second computer 25 as by wireless signals from the smart phone 62 to the wireless router 18 and hence via the Internet 19 to the second computer 64. Both an identification data I represented by wireless signal shown as a line of letters "I" and dispensing data D represented by the wireless signal shown as a line of letters "D" are shown as passing from the smart phone 62 to the wireless router 18.

As seen in FIG. 2, on the right hand side, the smart phone 62, the right hand dispenser 10, wireless router 18, the Internet 19 and the second computer 64 provide the personal compliance system 65 in which a second communication network is provided by reason of the communication system of the dispenser 10, a communication system of the smart phone 62, the wireless router 18, the Internet 19 and a communication system of the second computer 64.

In operation, when the right dispenser 10 is determined by the second proximity system to be sufficiently close to the smart phone 62 that the second person 60 carrying the smart phone 62 can have fluid from that respective dispenser dispensed onto the hand 61 of the second person 60, the right dispenser 10 is characterized as being the proximate dispenser. On dispensing of fluid by the right dispenser 10, while the right dispenser 10 comprises the proximate dispenser for the smart phone 62 of the second person 60, there is communication from the smart phone 62 of the identification data I to the second computer 64 and, as well, communication from the right dispenser 10 to the smart phone 62 and hence from the smart phone 62 to the second computer 64 the dispensing data D regarding the dispensing by the right dispenser 10. In the embodiment illustrated in FIG. 2, the communication of the dispensing data D by the right dispenser 60 is shown as passing from the right dispenser 10 to the smart phone 62 and, hence, to the second computer 64. The dispensing data D provided to the second computer 64 regarding the operation of each dispenser 10 by the second person 60 and the identification data I regarding the second person 60 is defined as personal data. The second computer 64 monitors the personal data regarding the dispensing of fluid by each of the dispensers 10 in the facility while each of the dispensers 10 is the proximate dispenser for the second person 60 and, based on this personal data, the second computer 64 calculates personal compliance data representing the dispensing of fluid by the various dispensers 10 for the second person 60 based on the personal data while each of the dispensers 10 is the proximate data for the second person 60.

All of the personal data sent via the smart phone 62 through the second computer 64 is security protected to prevent understanding of the data other than by components of the personal compliance system 65. For example, all the personal data may be encoded such as by encryption computer programs so as to be confidential. As another alternative, the second communication system may limit communication to being between various of the components of the personal compliance system 65, for example, by controlled pairing as found with Bluetooth systems. The second computer 64 as directed by the smart phone 62 under the control of the second person 60 will designate all of the personal data as private data including all of the data regarding the identification of the second person 60, regarding the designation of any of the dispensers as a proximate dispenser for the second person 60, and the dispensing from any dispenser 10 while it is a proximate dispenser and including any data derived from the personal data including all personal compliance data for the second person 60.

The second computer 64 is configured to prevent the communication from the personal compliance system 65 other than to the second person 60 of the private data unless authorized by the second person 60. The personal compliance system 65 communicates to the second person 60 selected of the private data for that second person 60 including notably personal compliance data regarding the second person 60.

A compliance systems 90 in accordance with the present invention preferably includes both the group compliance system 25 and the personal compliance system 65.

The personal hygiene computer application on the smart phone 62 preferably has a security system by which the second person 60 can select different modes of operation and thereby control the extent to which any private data or personal data is disclosed to others. For example, in an inactive most confidential first mode of operation selected by the second person 60, the security settings for the personal hygiene computer applications are set such that no private data whatsoever is gathered or monitored or disclosed whether on the smart phone 62 or in any other device. In this first mode, the personal compliance system 65 is effectively inactive. In this first mode, the second person 60 may, for example, merely receive the group data and group compliance data G from the first computer 24, preferably as a one-way communication to the smart phone 62 indicated on FIG. 2 as a line of letters "G" from a router 18 to the smart phone 62. The security system for the personal compliance system 65 preferably in a second mode of operation selected by the second person 60 controls the security setting such that all communication of the private data is maintained confidential within the personal compliance system 65, that is, between the smart phone 62 and the second computer 64 as preferably by suitable pairing, encryption and/or communication encoding which would prevent the group compliance system or any other devices from receiving and/or understanding the private data.

The security system for the personal compliance system 65 preferably in a third mode of operation selected by the second person 60 controls the security settings such that there is communication of the private data to the group compliance system 25 and its first computer 24 to the same extent that identification data for any first person 20 is communicated, however, with the exception of excluding any identification data I that actually identifies who the second person 60 is.

The security system for the personal compliance system preferably in a fourth mode of operation selected by the second person 60 controls the security settings such that there is communication of the private data to the group compliance system 25 and its first computer 24 to the same extent that identification data for any first person 20 is communicated, for example, including identification data I that actually identifies who the second person is.

The personal compliance system 65 would in any mode of operation preferably disclose the private data and selected portions of the private data to the second person 60 as accessible by the second person 60 in a suitable confidential manner, for example, under password protection on the smart phone 62 or otherwise as merely for view by the second person 60 as on the smart phone 62. The private data which is to be communicated from the smart phone 62 to the second person 60 is preferably private data representing suitably calculated personal compliance data representing the dispensing of fluid from each proximate dispenser including, for example, the number of dispensings to the second person 60 in a typical shift. The second computer 64 and/or the smart phone 62 preferably also receives from the first computer 24 selected of the group data and the group compliance data G representing the dispensing of fluid of all of the dispensers based on the group compliance data. Preferably, the second computer 64 or the smart phone 62 compares the personal compliance data with the group compliance data and calculates comparison data which is to be presented to the second person 60 via the smart phone 62. Such comparison data is of assistance in identifying to the second person 60 how their hygiene practices compare to hygiene practices of the group. Such comparison data is data which is considered as private data whose dissemination is subject to the security system for the personal compliance system 65 under the control of the second person 60 since the comparison data is data derived from the personal data.

The personal compliance system 65 preferably includes a reward system which monitors actions of the second person 60 and awards rewards to the second person 60 based on reward events monitored. Under the reward system, each reward event has a predetermined value of rewards. When a reward event is identified and monitored, the reward system awards the value of rewards for that event, keeps track of and monitors the award of all rewards, the redemption of the rewards and maintains a balance of unredeemed rewards. The reward system communicates to the second person 60 reward data regarding the rewards awarded, redeemed and the balance of unredeemed rewards. The reward system also communicates to the second person 60 data regarding any value in currency, goods or services for which the rewards can be redeemed. The events for which the reward system can monitor and award rewards can include, for example, without limitation, each event by which the personal compliance system 65 communicates personal data regarding the second person 60 about their operation of a dispenser 10. For example, each time a second person 60 operates a dispenser 10, a reward event may be deemed to have occurred and an appropriate award provided. Under the reward system, when an accumulative value or balance of unredeemed rewards exist for the second person 60, the second person 60 can redeem the rewards according to their value whether in currency, goods or services by a suitable system such as encrypted coupon which can be communicated via the smart phone 62 to the second person 60 and, for example, by the smart phone 62 to a goods or service provider.

As a first example, on each activation of a dispenser 10 by the second person 60 which is to be kept as private data, ten reward points may be placed in a reward account of the second person 60. Once 500 reward points are accumulated in the reward account of the second person 60, the second person 60 can request and redeem those 500 points for an encrypted coupon issued by the second computer 64 permitting the purchase of a cup of coffee at a particular coffee retail store, for example, preferably located in the facility. Once that coupon is redeemed at the coffee retail store, the balance of unredeemed rewards in the reward account is reduced by the 500 points.

Another event which can generate a reward is preferably an event by which the personal compliance system 65 communicates the personal data to the second person 60, for example, the personal compliance system 65 after a shift of work will communicate personal compliance data and a comparison of personal compliance data with group compliance data; the second person 60 will review the personal data communicated and acknowledge with the smart phone 62 that he has received and reviewed the personal data communicated. This event could, for example, represent a reward of 50 points in the first example.

In accordance with the present invention, preferably, the second person 60 selects with the security system of the personal compliance system 65 the mode of operation which selects the extent that the private data is kept confidential within the personal compliance system 65 and not disclosed to anyone other than the second person 60. Preferably, the reward system will as a function of the selected mode of operation vary the rewards awarded preferably to increase the rewards as less confidential modes are used, for example, to encourage the second person 60 to use the personal compliance system in less confidential modes.

The reward system preferably will provide for increased rewards to the second person 60 in the event the second person 60 changes the security setting and selects a mode of operation in which the private data is at least in part released from being confidential as, for example, is permitted to be communicated to the group compliance system 25. For example, the second person 60 may select the fourth mode of operation with the personal identification data to be communicated to the first computer 24 to the same extent that the personal compliance data is disclosed to the first computer 24 in respect of the badge carrying first person 20. In this case, the rewards system would monitor the personal data that the personal compliance system 65 would provide as from the second computer 64 to the first computer 24 or from the smart phone 62 directly to the first computer 24 and provide suitable rewards to the second person 60 based on the events monitored. In the first reward example, a reward for each use of a dispenser might be increased from ten points when in the second mode of operation to twenty points in the third mode of operation and to thirty points in the fourth mode of operation.

The reward system can be provided such that rewards are merely provided to the second person 60 when the second person 60 selects the third mode of operation or fourth mode of operation when at least some of the private data regarding his use of a dispenser and/or his identity is provided to the group compliance system and the first computer 24.

A system in accordance with the present invention thus as seen in FIG. 2 provides a group compliance system 25 in parallel with the personal compliance system 65. All data regarding the personal compliance system 65 and gathered thereby can be controlled by the second person 60 to remain confidential and not be shared or disclosed, for example, with the group compliance system 25. The second person 60 has the ability to select modes of operation and security settings for the security system which control the extent to which any of his activity or identity information can be kept confidential and not disclosed to the group compliance system 25 and, as well, the second person 60 can control the security system so as to permit some or all of data from the personal compliance system 65 to be disclosed to the group compliance system 25.

By providing an overall compliance system including a personal compliance system which is controlled by the second person in parallel with a group compliance system, a second person 60 who may have concerns regarding personal data disclosure may more easily be persuaded to agree to join the overall compliance system. Through experience as a user of the personal compliance system 65 in more confidential modes of operation, the second person 60 will be able to confidentially see as feedback his personal compliance data compared to the group compliance data. The second person 60 from this feedback may come to be confident that disclosure of his personal compliance data will not be prejudicial to him and this may assist the second person 60 in adopting less confidential modes of operation permitting increased amounts of his confidential data on the personal compliance system to be disclosed to the group compliance system for incorporation in the group compliance data. If the overall compliance system includes a reward system and the second person 60 comes to be rewarded by various rewards, the second person 60 may be motivated by increased rewards to increase the extent to which the confidential data from the personal compliance system 65 may be disclosed to the group compliance system 25.

The group compliance system 25 as illustrated in FIG. 2 may, for example, be adapted so as to collect information as regarding the operation of a dispenser 10 only when a first person 20 operates a dispenser with an identification badge 22. For example, in the context of FIG. 2, in the absence of the dispenser 10 sensing the proximity of an identification badge 22, no signal is sent by the dispenser 10 which will be recognized by the first computer 24 as being operation of the dispenser. That is, for example, with the first computer 24 possibly only acknowledging as a dispensing event wireless signals which simultaneously contain both dispensing data D and identification data I. In this example, the personal compliance system mode of operation could prevent the dispensing data regarding the second person 60 from being included in the group data as merely by not providing any identification data.

While not shown on FIG. 2, when the right dispenser 10 is operated by the second person 60 in one arrangement in accordance with this invention, the dispenser data D is to be delivered to the first computer 24 in which case the first computer 24 could use the dispensing data D in group compliance data, albeit, without any indication as to the identification of the second person 60. For example, in any facility, the mere fact that any of the dispensers 10 have been operated a number of times is relevant information for compliance monitoring if even none of the dispensings have any indication as to the identity of the person who may have operated the dispenser. In such an arrangement dispensing use by the second person 60 would be included in the group data, however, without identification data unless authorized by the second person 60.

The particular manner of operation of the group compliance systems 25 and 65 to communicate the relevant data to the respective first computer 24 and second computer 25 can adopt any manner of configurations.

Figure 3:
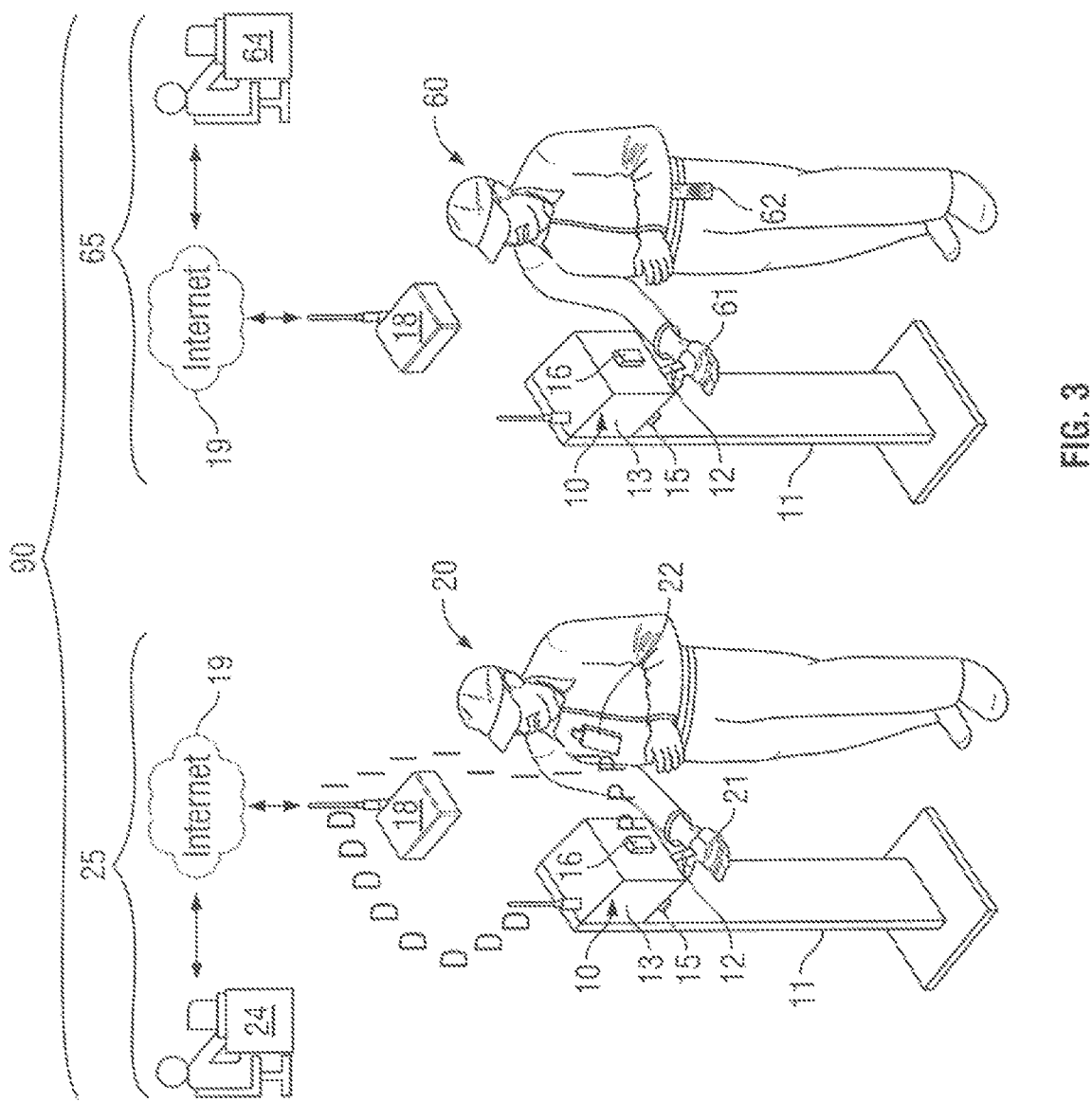
FIG. 3 is a view the same as FIG. 2 but showing a second embodiment of the left hand side group compliance system.
Figure 4:
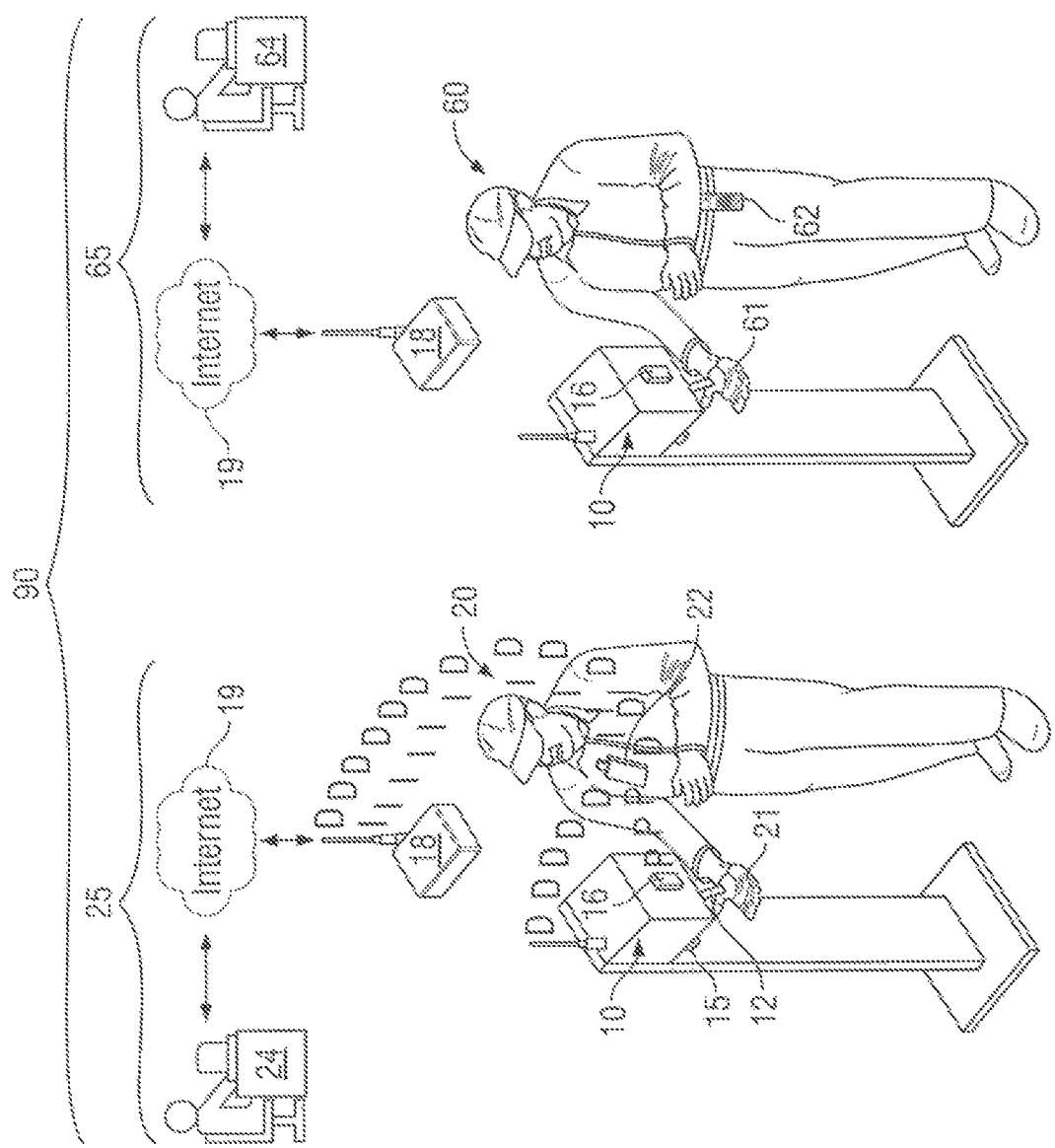
FIG. 4 is a view the same as FIG. 2 but showing a third embodiment of the left hand side group compliance system.

Each of FIGS. 3, 4 and 5 show second, third and fourth embodiments of the compliance monitoring system 90 and having close similarity. FIGS. 3 and 4 show alternate arrangements for the group compliance system 25 to communicate the dispenser data D to that in FIG. 2. For convenience, the communication of the personal compliance system is not shown on FIGS. 3 and 4. FIG. 5 shows an alternate arrangement for the personal compliance system 65 to communicate the dispenser data D to that in FIG. 2. For convenience, the communication of the personal compliance system is not shown on FIG. 5.

Reference is made to FIG. 3 which shows a second configuration of the group compliance system in which the dispensing data D is communicated from the dispenser 10 to the first computer 24 whereas the identification data I is communicated from the identification badge 22 to the first computer 24 without the identification data I necessarily passing through the dispenser 10.

Reference is made to FIG. 4 which shows a third configuration of the group compliance system in which the dispensing data D is communicated from the dispenser 10 to the identification badge 22 and the identification badge 22 communicates both the dispensing data D and the identification data I to the first computer 24.

While the preferred system illustrates a dispenser 10 with wireless communication to a router 18 and the router 18 via the Internet 19 to the first computer 24 or the second computer 64, it is to be appreciated that any dispenser 10 may be hardwired to the computers, or the computers may be hardwired to a router and the use of the routers and the Internet in a communication system are not essential. However, as wireless WiFi network are conveniently found in many facilities, the use of a WiFi wired communication system is preferred.

An arrangement as illustrated in FIG. 4 can be advantageous so as to minimize the communication capability of the dispenser 10, for example, to merely have the dispenser 10 include an ability to have its proximity with the identification badge 22 or smart phone 62 determined by the identification badge 22 or smart phone 62 and with the dispenser 10 to merely provide some signal on activation. In FIG. 4, preferably greater computing capability and communication capability is provided in the identification badge 22 or smart phone 62 for passing data onto the computers 24 or 64. In FIG. 4, the dispenser 10 may be a manually operated dispenser as taught by aforementioned U.S. Pat. No. 8,684, 236 or as disclosed in U.S. Patent Publication US 2013/ 0099929 to Ophardt et al, published Apr. 25, 2013.

Reference is made to FIG. 5 which illustrates a second embodiment of a parallel compliance system in accordance with the present invention. In the second embodiment, the processor within the smart phone 62 provides all functions of the second computer 64 in the other embodiments. This second embodiment has the advantage that the smart phone 62 controls all data and information which may be considered to be confidential as developed by the personal compliance system 65 without the need to pass encrypted needed information onto any other device. This arrangement is preferred for maximum security and thus maximum comfort to the second person 60 as to the confidentiality of private data. However, insofar as the parallel compliance system of FIG. 5 is to include a reward system, then the smart phone 62 may include a computer application that provides all features necessary to carry out the reward system without communication with other devices other than possibly on the actual redemption of a reward. More preferably, insofar as the reward system is to be incorporated, then a second computer such as 64 in FIG. 2 would be provided with the private data to be communicated between the smart phone 62 and the second computer 64 being limited by being encrypted or encoded data and/or being limited to communicate data that is merely an indication as to the number of reward points rewarded or redeemed and the like which would not identify the second person 60.

The compliance systems 25 and 65 of this invention may include systems for determining the location of any person within a facility such as by GPS, by triangulation from wireless routers or transmitters and by proximity systems to determine when an identification badge 22 or smart phone 62 may pass by or be close to one or more proximity sensors which may or may not be on any one of the dispensers 10. In addition, various operators may be provided within the facility which, when operated by a user as, for example, in the opening of a door 109 will trigger a communication which will identify either an identification badge 22 or the smart phone 62 as passing in proximity through the doorway. Similarly, a specific event such as the opening of a drawer containing an item which is to be used, for example, a kit for changing a bandage on a patient may trigger a signal identifying as by proximity the location of an identification badge 22 or cell phone 62 and identifying that a specific kit has been taken. Any one of these events can then trigger an expectation that hygiene events should occur such as, for example, an expectation that within an expected period of time after opening a door to a patient's room, a person will use a dispenser 10 nearby to wash their hands or an expectation that within an expected period of time after opening a kit to change a bandage, that a number of uses of a dispenser 10 nearby should occur. The compliance systems may look for hand washing events in space and time proximity to a triggered event and determine suitable compliance expectations based on the triggered event and whether such hygiene events are sensed afterwards. Each of the events may be considered as part of the group compliance system or as part of a personal compliance system or both with, for example, as controlled by the second person 60 the information of the personal compliance system 65 being kept secret and confidential as controlled by the second person 60.

Preferably, in accordance with the present invention, the personal compliance system 65 will prevent the group compliance system or other systems from determining the location of the second person 60 within the facility unless the second person 60 authorizes their location to be determined. For example, a suitable selection of features on the smart phone 62 can be made to avoid personal location systems being operational based on interactions with the smart phone 62.

In accordance with the preferred embodiment, the first person 20 is shown as carrying an identification badge 22 and the second person 60 is shown as carrying the smart phone 62. The identification badge 22 may comprise a smart phone albeit programmed for suitable different functions. Each of the identification badge 22 and the smart phone 62 could be a portable personal computer, however, which preferably at least when carried with the second person 60 needs to be able to receive input from the second person 60 and to communicate with the second person 60, for example, on a video screen or audibly.

In accordance with the present invention, various communications and notifications may be sent by the personal compliance system 65 and the group compliance system, suitably security protected as controlled by the second person 60, including prompts suggesting the person wash their hands or instructions how to use any item, such as a kit for changing a bandage, associated with any triggered event.

The group compliance system 25 includes a badge proximity system and the personal compliance system 65 includes a phone proximity system which may be the same or different than the badge proximity system. Each of these proximity systems preferably are a wireless proximity system. The particular nature of these proximity systems is not limited. In a first preferred such system, there would be a signal emitted by one of the dispenser and the smart phone 62 (or the ID badge 22) and a sensor on the other of the dispenser 10 and the smart phone 62 (or the ID badge 22). The relative strength of the signal transmitted by an emitter can provide an indication as to the proximity of the person 60 (or 20) to the dispenser 10. However, the relative signal strength may vary having regard to a number of factors such as the relative extent to which the battery on the dispenser 10 or cell phone 62 may be fully charged, the location of the cell phone 62 on the person as, for example, exposed or covered in a pocket or jacket; the relative orientation of the person 60 to the dispenser 10 and various other items. In a more preferred system, there is provided two or more emitters, for example, two or more emitters on the dispenser at spaced locations on the dispenser 10 or, for example, two or more sensors at spaced locations on the dispenser 10 which can by the relative strength of the signal sensed by a single sensor or by two sensors better determine the proximity of the dispenser 10 and the cell phone 62.

The specific nature of the wireless signal for the proximity system which is emitted and sensed is not limited. Preferably, it may be an electromagnetic signal, preferably, a radio frequency. However, the signal may also comprise a sound signal, more preferably, an ultrasonic signal which can, for example, be emitted by one or both of the dispenser 10 and the smart phone 62 and be emitted from one or more speakers and sensed by one or more microphones on the dispenser 10 or the smart phone 62.

The proximity system may also comprise a near field arrangement which establishes communication when the dispensers and smart phone are brought into close proximity. The proximity system may use a capacitive sensor to detect and measure proximity, for example, without limitation to sense the mass of the person 20 or 60 proximate the dispenser 10 or vice versa. Different combinations of proximity sensing arrangements can be utilized to enhance the accuracy of the proximity sensing.

The proximity sensing system may be provided by location systems that serve to determine the location of any dispenser within a facility and, as well, then serve to locate the location of any badge 22 or cell phone 62 within a facility and to determine proximity as when the person 10 and, for example, the cell phone 62 are deemed to be sufficiently proximate that the user could use the system. However, insofar as proximity is determined by use of location of the person 60 and the dispenser, caution needs to be taken that there are safeguards in place to ensure the secrecy of the identity of the person 60 in the personal compliance system.

A proximity sensing system for any particular dispenser need not, however, necessarily have a proximity sensor on the dispenser. Insofar as the dispenser may, for example, be within a particular room in the facility which might, for example, have a number of dispensers then, for example, a proximity sensing system could include proximity sensors within that room which could, for example, determine when the cell phone 62 is proximate to any one of the dispensers.

In the embodiment of FIG. 2, the personal compliance system 65 is shown as providing communication between the smart phone 62 and the second computer 64 through a router 18 and the Internet. It is to be appreciated that this is not necessary and the communication from the cell phone 62 may be to the computer 64 by many other paths. For example, the smart phone 62 preferably has capability for storing data as well as preferably for configuring, calculating and reconfiguring data. The smart phone 62 may retain data regarding operation of a dispenser 10 as well as other data on the smart phone only for transference to the second computer 64 and only periodically rather than constantly. For example, the cell phone 62 might only communicate with specific portals to the computer 64 as, for example, through a hardwired connection to a user's private computer for increased security or, for example, only from time to time as, for example, at the end of a shift, day, week or month and, in which case, the user 60 may in fact control such transfer of information from the memory of the cell phone 62 to the second computer 64.

Of course, it is to be appreciated that in respect of a preferred configuration, the cell phone 62 may at least be in constant communication with the router 18 within the facility and there may be continued opportunity for communication between the cell phone 62 and the computer 64, however, this is not necessary.

The various FIGS. 2 to 6 show various arrangements for the group compliance system 25 and the personal compliance system 65. Insofar as the user 60 may select a mode of operation which permits confidential information of the personal compliance system 65 to be transferred to the group compliance system, then of course, such communication, while not shown on FIGS. 2 to 5, may be conveniently provided between the computers 24 and 64 as via the Internet or, of course, alternatively.

In accordance with the present invention, FIGS. 2 to 5 schematically illustrate a suitable arrangement. Preferably, however, as in the environment of a hospital, each of the group compliance system 25 and the personal compliance system may 65 may include a data collection computer which would act as a buffer and securely receive from each of the routers 18 data regarding the relative system keeping the data regarding the relative systems confidential. Each of these data collection computers would then, after gathering the data and possibly doing some manipulation, preferably send the data as in secure packets as via a virtual private network to the relative first computer 24 and the second computer 64 in a confidential manner. It is to be appreciated by persons skilled in the art that merely a single data collection computer might need to be provided on site in a facility which could keep any data secret and separate in respect of the two compliance systems 24 and 64 and yet permit for relative transfer of the data to the first computer 24 or second computer 64.

The embodiment of FIG. 5 illustrates an arrangement in which a cell phone 62 effectively serves all of the functions of the second computer 64. Such an arrangement can be particularly useful as, for example, in relatively small, real or conceptual facility such as within a doctor's office that may have one, two, three or other relatively small number of persons and, for example, in which the facility to be covered may in fact comprise a number of relatively facilities.

In accordance with the present invention, particularly in the embodiment of FIG. 5, the compliance system 90 has an ability to permit the various users 60 to share their information into various privacy groups such as, for example, with a privacy group comprising merely one person 60 or possibly a plurality of persons 60 in respect of which their private small group information could be shared merely between them by various social media such as a Facebook™ system and the like in a confidential manner. The personal compliance system 65 could adopt a mode of operation which would permit the development of such small private groups for suitable gathering of confidential data and suitable, for example, for delivery of such data as authorized by the individual users on a periodic basis for sharing, for example, to a social media site such as a Facebook™ site and the like.

A smart phone 62 or an identification badge 22 preferably has a capability for storing data regarding dispensing for transfer, for example, via the routers and the Internet to the respective computers 24 and 64, periodically or from time to time as can be advantageous, for example, if there may be areas within a facility in which the communication between the smart phone 62 or the badge 22 and the Internet may not be temporarily working or may be weak and cannot properly communicate.

In accordance with the present invention, a personal compliance system may be utilized, for example, to provide different confidentiality requirements on data gathered in respect of different groups of persons within a facility, for example, between visitors and employees.

While the invention has been described with reference to preferred embodiments, many modifications and variations will now occur to persons skilled in the art. For a definition of the invention, reference is made to the following claims.

I claim:

1. A method of monitoring the use of a plurality of hand cleaning fluid dispensers in a facility frequented by a number of persons, wherein:
each of the dispensers is located at a location in the facility spaced relative the location of other of the dispensers and, when activated by a person proximate each respective dispenser, each dispenser dispenses a fluid onto the person's hand suitably positioned relative the dispenser,
the method comprising:
providing a group compliance system comprising a first computer and a first communications network providing communication between each of the dispensers and the first computer,
on the dispensing of the fluid by each of the dispensers, communicating data from each of the dispensers regarding the dispensing of fluid by each of the dispensers to the first computer via the first communications network; defining group data to include the data from each of the dispensers regarding the dispensing of the fluid by the dispensers communicated to the first computer;
monitoring with the first computer the group data and calculating group compliance data representing the dispensing of fluid by the dispensers based on the group data,
providing a personal compliance system comprising a personal computing device carried by one person and a second communication network providing communication between each of the dispensers and the personal computing device,
determining when any one of the dispensers is a proximate dispenser by being sufficiently close to the personal computing device that the one person carrying the personal computing device can have fluid from that respective dispenser dispensed onto a hand of the one person,
on the dispensing of the fluid by each of the dispensers while each comprises the proximate dispenser, communicating data from the proximate dispenser regarding the dispensing by the proximate dispenser to the personal compliance system, defining personal data to include the data from the proximate dispenser regarding the dispensing by the proximate dispenser, and communicating the personal data to the personal compliance system;
monitoring with the personal compliance system the personal data and calculating personal compliance data representing the dispensing of fluid by the dispensers based on the personal data,
designating as private data the personal data and data derived therefrom including the personal compliance data;
preventing communication from the personal compliance system other than to the one person of the private data unless authorized by the one person,
communicating from the personal compliance system to the one person of the personal compliance data or data derived therefrom to the one person.

2. The method as claimed in claim 1 wherein:
the first computer communicating the group compliance data to the personal compliance system;
the personal compliance system comparing the personal compliance data with the group compliance data and calculating comparison data representative of the such comparing, the comparison data comprising part of the private data;
communicating from the personal compliance system to the one person the comparison data.

3. The method as claimed in claim 2 wherein:
the first computer communicating the group compliance data to the personal compliance system; and
the personal compliance system communicating the group compliance data to the one person.

4. The method as claimed in claim 3 wherein as authorized by the one person, communicating with the personal compliance system, the personal compliance data or the data derived therefrom to the one person via the personal computing device.

5. The method as claimed in claim 4 including providing the personal compliance system with identification data identifying the one person, and wherein the personal data includes the identification data.

6. The method claimed in claim 1 wherein the first computer monitors the dispensing of fluid by each of the dispensers by all persons including the one person.

7. The method as claimed in claim 1 wherein the first computer monitors the dispensing of fluid by each of the dispensers by a number of persons in a predetermined group of persons which group does not include the one person.

8. The method as claimed in claim 7 wherein the first computer monitors the dispensing of the fluid by each of the dispensers by a number of persons in a predetermined group of persons which group include the one person,
having each person in the group carry an identification tag;
determining by cooperation of the identification tag and each of the dispensers when any one identification tag and a respective one of dispensers are sufficiently close that the person carrying the one identification tag can activate the respective one dispenser to dispense fluid, and limiting data used in calculation of at least some of the group compliance data to data regarding dispensing from the dispensers at a time when the any one identification tag and the respective one of the dispensers are sufficiently close that the person carrying the one identification tag can activate the respective one dispenser to dispense the fluid.

9. The method as claimed in claim 8 wherein data linking the identification tag to the one person comprises personal data which is not provided to the first computer except as authorized by the one person.

10. The method as claimed in claim 1 wherein the step of determining when any one of the dispensers is a proximate dispenser is carried out by the personal compliance system and each dispenser cooperating to provide a proximity system.

11. The method as claimed in claim 1 including enabling the one person by use of the personal computing device to permit the personal computing device to communicate to the personal compliance system portions of the private data.

12. The method as claimed in claim 1 including:
providing a rewards system which monitors events including each event by which the personal compliance system communicates the personal data to the one person, and awards rewards to the one person based on the events monitored,
permitting the redemption of the rewards by the one person redeeming the rewards for a value in currency, goods or services; and
monitoring the award of the rewards, redemption of the rewards and a balance of unredeemed rewards and communicating to the one person reward data regarding the rewards including any value in currency, goods or services for which the rewards can be redeemed.

13. The method as claimed in claim 12 wherein the events further include each event by which the personal compliance system communicates the personal data to the first computer.

14. The method as claimed in claim 1 including protecting the private data from being communicated by the personal compliance system other than as encrypted for decryption by the personal compliance system or as authorized by the one person by the group compliance system.

15. The method as claimed in claim 1 including providing a security system which permits the one person to select different modes of operation of the personal compliance system selected from the group consisting of:
a first mode preventing any communication of the private data from the personal computing device other than to the one person,
a second mode preventing communication of the private data from the personal compliance system other than to the personal computing device,
a third mode preventing communication of the private data from the personal compliance system other than to the one person and preventing communication of the private data that includes identification data identifying the identity of the one person to the group compliance system, and
a fourth mode of preventing communication of the private data from the personal compliance system other than to the one person and the group compliance system.

16. The method as claimed in claim 1 including further designating as the private data all data identifying the one person.

17. The method as claimed in claim 1 including providing the personal compliance system with identification data identifying the one person, and wherein the personal data includes the identification data.

18. A method of monitoring the use of a plurality of hand cleaning fluid dispensers in a facility frequented by a number of persons, wherein:
each of the dispensers is located at a location in the facility spaced relative the location of other of the dispensers and, when activated by a person proximate each respective dispenser, each dispenser dispenses a fluid onto the person's hand suitably positioned relative the dispenser,
the method comprising:
providing a group compliance system comprising a first computer and a first communications network providing communication between each of the dispensers and the first computer,
on the dispensing of the fluid by each of the dispensers, communicating data from each of the dispensers regarding the dispensing of fluid by each of the dispensers to the first computer via the first communications network; defining group data to include the data from each of the dispensers regarding the dispensing by the dispensers communicated to the first computer;
monitoring with the first computer the group data and calculating group compliance data representing the dispensing of fluid by the dispensers based on the group data,
providing a personal compliance system comprising a personal computing device carried by one person and a second communication network providing communication between each of the dispensers and the personal computing device,
providing the personal compliance system with identification data uniquely identifying the one person;
determining when any one of the dispensers is a proximate dispenser by being sufficiently close to the personal computing device that the one person carrying the personal computing device can have fluid from that respective dispenser dispensed onto a hand of the one person,
on the dispensing of the fluid by each of the dispensers while each comprises the proximate dispenser, communicating data from the proximate dispenser regarding the dispensing by the proximate dispenser wirelessly to the personal compliance system,
defining personal data to include the identification data and the data from the proximate dispenser regarding the dispensing by the proximate dispenser,
communicating the personal data to the personal compliance system;
monitoring with the personal compliance system the personal data and calculating personal compliance data representing the dispensing of fluid by the dispensers based on the personal data,
designating as private data all data regarding the identification of the one person including the personal data and data derived therefrom including the personal compliance data;
preventing communication from the personal compliance system other than to the one person of the private data unless authorized by the one person, communicating from the personal compliance system to the one person of the personal compliance data or data derived therefrom to the one person.

19. A compliance system in a facility including:

a plurality of hand cleaning fluid dispensers, each of the dispensers located at a location in the facility spaced relative the location of other of the dispensers, when activated by a user proximate each respective dispenser, each dispenser dispensing a fluid onto the user's hand suitably positioned relative the dispenser, a group compliance system comprising a first computer and a first communications network providing communication between each of the dispensers and the first computer, each of the dispensers providing data to the first computer via the first communications network regarding the dispensing of the fluid by each of the dispensers;

the first computer monitoring the data regarding the dispensing of the fluid by each of the dispensers and calculating group compliance data representing the dispensing of the fluid by the dispensers, a personal compliance system comprising a personal computing device carried by one person and a second computer, each of the dispensers providing data to the personal compliance system representing the dispensing of the fluid by each of the dispensers when each of the dispensers are activated and dispense the fluid onto the hand of the one person;

the personal compliance system monitoring the data regarding the dispensing of the fluid by each of the dispensers by the one person and calculating personal compliance data representing the dispensing of the fluid by the one person, the first computer providing the group compliance data to the personal compliance system;

the personal compliance system comparing the personal compliance data with the group compliance data and calculating comparison data representative of the such comparing, the personal compliance system communicating the comparison data to the one person;

the personal compliance system and each dispenser cooperate to provide a proximity system which determines when the personal computing device and a respective dispenser of the dispensers is sufficiently close that the one person carrying the personal computing device can activate the respective dispenser, and the personal compliance system limiting data used in the calculation of at least some of the personal compliance data to data regarding dispensing from each of the dispensers at a time when the personal computing device and each of the dispensers is sufficiently close that the one person carrying the personal computing device can activate each of the dispensers.

20. The compliance system as claimed in claim 19 wherein the personal compliance system prevents communication from the personal compliance system other than to the one person of all data regarding the identification of the one person.

\* \* \* \* \*